US009836369B2

(12) United States Patent
Macko et al.

(10) Patent No.: US 9,836,369 B2
(45) Date of Patent: Dec. 5, 2017

(54) STORAGE SYSTEM TO RECOVER AND REWRITE OVERWRITTEN DATA

(71) Applicant: NetApp, Inc., Sunnyvale, CA (US)

(72) Inventors: Peter Macko, Waltham, MA (US); Steve Byan, Waltham, MA (US)

(73) Assignee: NETAPP, INC., Sunnyvale, CA (US)

( * ) Notice: Subject to any disclaimer, the term of this patent is extended or adjusted under 35 U.S.C. 154(b) by 78 days.

(21) Appl. No.: 14/927,304

(22) Filed: Oct. 29, 2015

(65) Prior Publication Data

US 2017/0123944 A1    May 4, 2017

(51) Int. Cl.
| | |
|---|---|
| *G06F 11/00* | (2006.01) |
| *G06F 11/20* | (2006.01) |
| *G11B 20/18* | (2006.01) |
| *G11B 20/10* | (2006.01) |
| *G11B 20/12* | (2006.01) |

(52) U.S. Cl.
CPC .... *G06F 11/2069* (2013.01); *G11B 20/10527* (2013.01); *G11B 20/1217* (2013.01); *G11B 20/1803* (2013.01); *G06F 2201/805* (2013.01)

(58) Field of Classification Search
USPC ........................................................ 714/6.21
See application file for complete search history.

(56) References Cited

U.S. PATENT DOCUMENTS

| | | | | |
|---|---|---|---|---|
| 7,752,491 | B1* | 7/2010 | Liikanen ............. | G06F 11/2087 714/6.13 |
| 2004/0125738 | A1* | 7/2004 | Lee ....................... | G11B 7/007 369/275.3 |
| 2011/0099420 | A1* | 4/2011 | MacDonald ........ | G06F 11/2025 714/6.32 |
| 2015/0135005 | A1* | 5/2015 | Hsu-Hung .......... | G06F 11/1096 714/6.24 |

OTHER PUBLICATIONS

Aghayev et al., "Skylight—A Window on Shingled Disk Operation," 13th USENIX Conference on File and Storage Technologies (FAST '15), Feb. 16-19, 2015, Santa Clara, CA, USA, 135-149.
Amer et al., "Data Management and Layout for Shingled Magnetic Recording," IEEE TMAG 2011, 1-7.
Cassuto et al., "Indirection Systems for Shingled-Recording Disk Drives," Research Gate, DOI: 10.1109/MSST.2010.5496971, IEEE MSST May 7, 2010, 1-45.
Dhas et al., "Evaluation of Nilfs2 for Shingled Magnetic Recording (SMR) Disks," Technical Report FSL-14-03, 2014, 1-6.
(Continued)

*Primary Examiner* — Sarai Butler
(74) *Attorney, Agent, or Firm* — Gilliam IP PLLC

(57) ABSTRACT

A storage system to recover and rewrite overwritten data is described. A Shingled Magnetic Recording (SMR) array subsystem within the storage system writes data to multiple adjacent tracks on a number of storage devices, such as hard drives that support shingled magnetic recording. While writing data, the SMR array subsystem detects that one of the storage devices erroneously overwrote a portion of the data on one or more of the tracks. The SMR array subsystem can recover the overwritten portion of data using other portions of the data written to corresponding tracks on the other storage devices that are part of the array. The recovered data can then be rewritten to the array.

22 Claims, 8 Drawing Sheets

(56) References Cited

OTHER PUBLICATIONS

Gibson et al., "Directions for Shingled-Write and Two-Dimensional Magnetic Recording System Architectures: Synergies with Solid-State Disks," Carnegie Mellon University Parallel Data Lab Technical Report CMU-PDL-09-104 May 2009, 1-3.
Jin et al., "HiSMRfs: a High Performance File System for Shingled Storage Array," IEEE MSST 2014, 1-6.
Lin et al., "H-SWD: Incorporating Hot Data Identification into Shingled Write Disks," IEEE MASCOTS 2012, 1-10.
Wan et al., "High Performance and High Capacity Hybrid Shingled-Recording Disk System," IEEE CLOUD 2012, 173-181.

* cited by examiner

Detailed Example: RAID-1 (Mirroring), 2 drives

| Append: | [ 8 ] | | |
|---|---|---|---|
| Flash | [ 8 ] ◁ | [ 8 ] | |
| Disk 1 | | [ 8 ] ◁ | |
| Disk 2 | | | |
| Step | Append [ 8 ] to flash | Copy from flash to Disk 1 | |

| Append: | [ 1 ] | | |
|---|---|---|---|
| Flash | [ 8 ][ 1 ] ◁ | [ 8 ][ 1 ] | [ 1 ] ◁ |
| Disk 1 | [ 8 ] | [ 8 ] | [ 8 ] |
| Disk 2 | | [ 8 ][ 1 ] ◁ | [ 8 ][ 1 ] |
| Step | Append [ 1 ] to flash | Copy from flash to Disk 2 | Retain 1 element in flash |

| Append: | [ 2 ] | | |
|---|---|---|---|
| Flash | [ 1 ][ 2 ] ◁ | [ 1 ][ 2 ] | [ 2 ] ◁ |
| Disk 1 | [ 8 ] | [ 8 ][ 1 ][ 2 ] ◁ | [ 8 ][ 1 ][ 2 ] |
| Disk 2 | [ 8 ][ 1 ] | [ 8 ][ 1 ] | [ 8 ][ 1 ] |
| Step | Append [ 2 ] to flash | Copy from flash to Disk 1 | Retain 1 element in flash |

FIG. 4

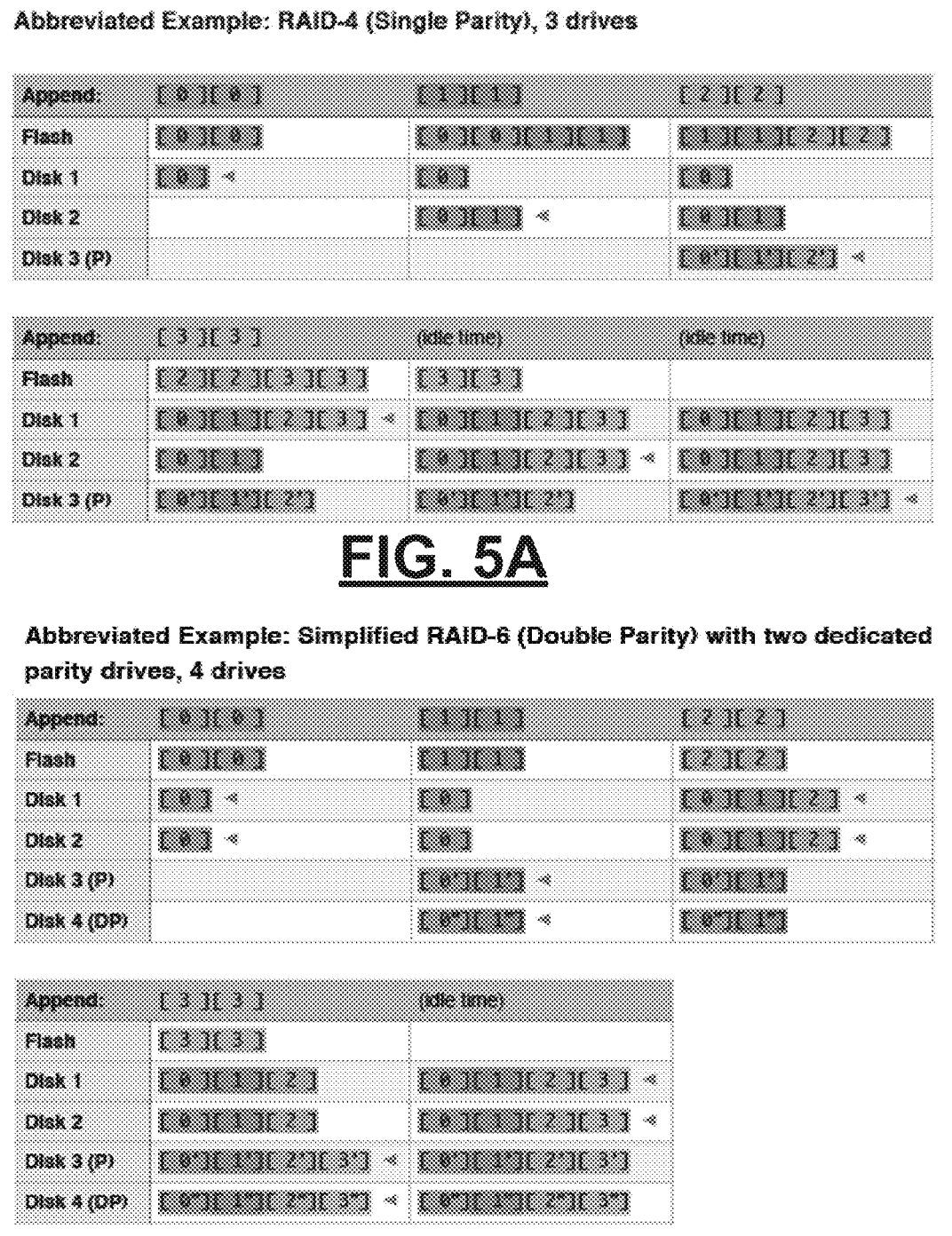

Abbreviated Example: RAID-4 (Single Parity), 3 drives

FIG. 5A

Abbreviated Example: Simplified RAID-6 (Double Parity) with two dedicated parity drives, 4 drives

STORAGE SYSTEM TO RECOVER AND REWRITE OVERWRITTEN DATA

TECHNICAL FIELD

Examples described herein relate to storage devices, and more specifically, to a storage system to recover and rewrite overwritten data.

BACKGROUND

Hard Disk Drives (HDDs) remain popular storage devices due to their large capacity and low cost. Although non-volatile flash-based Solid State Drives (SSDs) have attracted considerable attentions for their ability to replace HDDs in many applications, they are more expensive than HDDs, especially as storage capacity increases. In addition, the digital data explosion demands a huge amount of storage space, especially for backup and archives. These facts ensure that HDDs still retain their own merits against SSDs and serve as an important component in diverse applications. Thanks to advances in recording technology, manufacturing, and materials, drive capacity has grown by nearly six orders of magnitude in the last fifty years. However, magnetic HDDs are increasingly nearing a density limit imposed by the super-paramagnetic effect for perpendicular recording. While current drives store 400 GB/in$^2$, the current limit is estimated to be about 1 TB/in$^2$. As a result, new approaches are needed to ensure that disk density continues to improve. One such approach has been developed in the form of shingled drives, such as Shingled Magnetic Recording (SMR) drives, which can achieve much higher data density than more conventional magnetic HDDs. Shingled drives offer minimal changes to disk hardware and recording technology, but they also have very limited or non-existent ability to perform random writes.

To improve storage density over traditional magnetic drives, shingled drives use a write head with a stronger, but asymmetric, magnetic field to overlap the currently written track with the previous track, leaving only a relatively small strip of the previous write track untouched. While this smaller strip is a fraction of the feasible write size, it is still sufficiently large to be read with current Giant Magneto-Resistive (GMR) read heads, which do not require as strong of a magnetic field as write heads. As a result, shingled writing can place readable tracks closer together and increase data density within tracks themselves, further extending the limits of perpendicular magnetic recording.

BRIEF DESCRIPTION OF THE DRAWINGS

FIG. 4 illustrates a set of example operations for storing data and writing the data to a shingled magnetic drive array in a RAID-1 type configuration, in accordance with some aspects.

FIG. 5A illustrates a set of example operations for storing data and writing the data to a shingled magnetic drive array in a RAID-4 type configuration, in accordance with some aspects.

FIG. 5B illustrates a set of example operations for storing data and writing the data to a shingled magnetic drive array in a RAID-6 type configuration, in accordance with some aspects.

FIG. 6 illustrates a set of example operations for storing data and writing the data using two-dimensional RAID striping to a shingled magnetic drive array in a RAID-4 type configuration, in accordance with some aspects.

DETAILED DESCRIPTION

Figure 1:
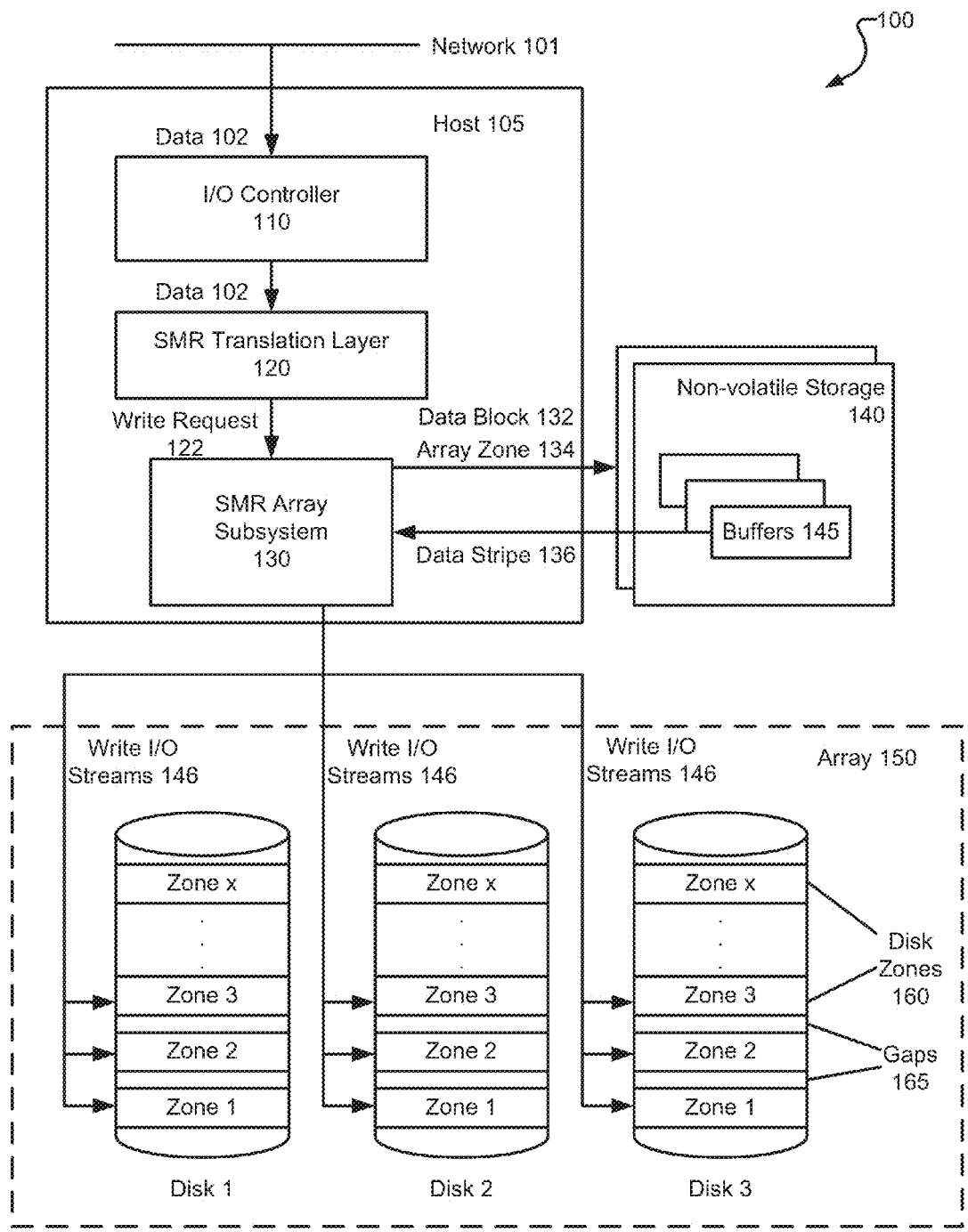
FIG. 1 illustrates an example system for raid configurations for shingled magnetic recording drives with wandering write protection, in accordance with some aspects.

Examples as described include a storage system which uses multiple tracks of multiple devices for the purpose of recovering data that was erroneously overwritten. According to some examples, when data written to a track is erroneously overwritten, examples as described provide for the storage system to use corresponding tracks of other storage devices to recover and rewrite the lost data.

In providing a mechanism to recover overwritten data, examples as described recognize the emergence of new types of storage media which leverage existing technologies while offering more dense or efficient storage. Examples recognize that while such new storage media offer storage efficiency and capacity, they sometimes include inherent shortcomings in regards to their ability to recover and rewrite data. By addressing this shortcoming, examples make alternatives to HDD devices more attractive for enterprise and commercial environments. For example, shingled drives (such as provided by SMR) operate by writing to new magnetic tracks that partially overlap the previously written tracks. The partial overwriting can be done in accordance with a pattern (e.g., roof shingles). In regards to storage capacity, the shingled drive is effective because it accounts for physical limitations that force magnetic writing heads to be wider than their corresponding reading heads, which means that conventional magnetic data tracks are much wider than necessary for reading. By adopting SMR technology, shingled drives create narrower, readable tracks that allow for higher track density. In addition, shingled drives do not require significant changes to the existing magnetic recording HDD makeup and write head, and they can increase the storage capacity of magnetic drives with no impact on cost or the stability of written bits on the drive.

One of the downsides to SMR is that, due to the wider write head and the partially overlapped track layout design, writing to one shingled track affects the data stored on adjacent shingled tracks. As a result, tracks must be written in a specific order, and once overlapped, a shingled track cannot be updated in place because the tracks overlapping it can be overwritten by the update. Typically, this means that writes must be done sequentially because a single track write destroys the adjacent 4-8 tracks. This property of SMR makes random writes difficult and costly, which radically changes the way a system must interact with shingled drives.

Nevertheless, shingled drives can, for many operational environments, effectively replace tape for backup and archival data because of the largely-sequential, rather than random, nature of writes to backup and archival storage. Moreover, shingled drives still allow for traditional random access reads, which makes them more attractive than tapes for backups.

In addition to the problems caused by purposely overwriting portions of adjacent tracks to pack in data, shingled drives can also be vulnerable to accidental overwrites that destroy data entirely. Normal writes that "wander" off-track and overwrite previously written data are known as wandering writes and are a problem in the way of SMR adoption. The large write heads and closely-packed tracks require a higher level of precision and leave less room for error while writing data, which results in a drive that is less reliable and less fault-tolerant. For example, relatively minor vibrations that would have no effect on an HDD can move the write head or disk platter of a shingled drive out of alignment enough to cause a normal write to wander off-track, that is, to write to an adjacent track by mistake. If multiple shingled drives are located on the same disk shelf, a single vibration can even cause a wandering write on more than one of the drives simultaneously. Also, as drive manufacturers attempt to increase storage and reduce costs of their products, they may cut corners and use subpar components, further exacerbating the wandering write problem.

Regarding data layout, shingled drives store the bulk of their data in zones, which are collections of adjacent tracks in which data can only be appended. Zones are each separated by a gap large enough that a write to the last track in a zone does not destroy the data in the first track of the subsequent zone. Without these gaps, any write to a shingled drive would require re-writing all data stored in later tracks. In some aspects, zones consist of contiguous tracks on the same surface, although other physical layouts such as incorporating parallel tracks on all surfaces (i.e., cylinders) into zones are possible.

In order to ensure data integrity while writing to shingled drives, a system incorporating shingled drives should be able to detect and recover from wandering writes without a loss of data. According to some examples, a system for managing shingled magnetic recording drives combines a RAID-like configuration for host-managed shingled drives and a small persistent cache to provide protection against wandering writes, including both correlated and recursive wandering write errors. As described by some examples, a storage system can operate to organize or identify collections of disk zones on an array of shingled drives as an array zone and maintain a non-volatile buffer for each array zone that contains recently appended data until all of its blocks are written to the drives. In some implementations, the system writes to no more than R drives at a time, where R is the number of redundancy disks (such as 1 for RAID-4 or 2 for RAID-6). Among other benefits, such a feature makes a recovery process from wandering writes more readily available, because the writing process bounds the number of affected drives to R.

In other aspects, a storage system as described by various examples can operate to write to multiple array zones simultaneously in a staggered fashion so that wandering write events are limited to at most R disk zones in each array zone. In such an example, the storage system can recover zones affected by wandering writes on those drives using a combination of the RAID mechanism and the contents of the flash buffer.

Examples as described further provide numerous benefits over conventional approaches, including protecting against wandering writes on shingled drives while minimizing the amount of persistent cache required to ensure data integrity. Still further, some examples include a storage system that works well for read-mostly applications and scenarios, with small writes at a cost of reduced write throughput for large sustained writes.

In addition, some examples provide for a storage system which can operate to preserve RAID's high aggregated read throughput, and once all writes finish, the resulting disks look just like traditional RAID. Such a storage system can address the reduced write throughput through two-dimensional striping that trades improved write performance for increased fragmentation while reading. In this regard, examples improve performance, efficiency, and reliability of computer systems used for data storage. Although examples herein are described using shingled drives, they can be applied to other types of storage media with similar properties and vulnerabilities as shingled drives.

Some examples include a Shingled Magnetic Recording (SMR) array subsystem writes data to multiple adjacent tracks on a number of storage devices, such as hard drives that support shingled magnetic recording. While writing data, the SMR array subsystem detects that one of the storage devices erroneously overwrote a portion of the data on one or more of the tracks. The SMR array subsystem can recover the overwritten portion of data using other portions of the data written to corresponding tracks on the other storage devices that are part of the array. The recovered data can then be rewritten to the array.

Still further, in some examples, a storage system provides multiple adjacent tracks that can operate to provide a zone, and multiple storage devices can be divided into a number of zones with a gap of tracks between each zone.

In some examples, an SMR array subsystem operates to write data to multiple storage devices with the use of a buffer that corresponds to one of the zones on each of the storage devices in the array. According to examples, an SMR array subsystem calculates parity, or redundant information, for the data based on how many of the storage devices are used for redundancy (i.e., a number of parity drives depending on the RAID level). The redundant information and blocks of data are written to the zones on each of the storage devices. The SMR array subsystem can retain each block of the data in the buffer until there is sufficient data and redundant information written to the zones on the storage devices to recover that block of data.

In some aspects, a storage system is operated to recover the portion of the data that was overwritten when the blocks comprising that portion are still retained in the buffer.

In one aspect, a storage system includes a buffer that corresponds to an array zone comprising a single disk zone on each of the storage devices. In such an example, data is simultaneously written to only one of multiple storage devices for each parity storage device or mirror storage device in use within the system at that time.

In another aspect, the buffer corresponds to an array zone comprising multiple disk zones on each of the storage devices and the data is simultaneously written to disk zones in a staggered fashion on each of the storage devices.

The term "device-managed SMR" and variants thereof refer to drives that hide the complexity of SMR from the host system by managing SMR in the firmware and presenting an interface like any other hard drive. "Host-managed SMR" or "host-aware SMR" refers to devices that utilize software external to the drive, such as the host operating system, to properly write to a shingled drive.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 illustrates a storage system 100, within which raid configurations for shingled magnetic recording (SMR) drives with wandering write protection may be provided, in accordance with some aspects. In an example shown, the storage system 100 includes a host 105 with an SMR array subsystem 130, non-volatile storage 140, and an array 150 of SMR disks. When data 102 is received, the SMR array subsystem 130 can organize the data 102 into stripes and write the stripes to disk zones 160 on the array 150 of SMR disks in a manner that protects against the loss of data from wandering writes, which are normal writes that wander off-track and overwrite previously written data. In addition, the SMR array subsystem 130 can stripe and buffer the data 102 in a manner that minimizes the amount of non-volatile storage 140 required to ensure data integrity during the writing process.

In some aspects, host 105 receives data, such as from network 101, and an I/O controller 110 on the host 105 determines that the data 102 should be written to SMR drives. Host 105 can contain many other possible subsystems connected to I/O controller 110 that are not illustrated, such as regular hard disk drives, solid state drives, optical media drives, etc. Due to the unique layout of SMR drives, host 105 can include an SMR translation layer 120 that can convert the data 102 into one or more write requests 122 that specify which array zones 134 certain data blocks 132 should be written to. These write requests 122 can then be sent to the SMR array subsystem 130. In other aspects, the host 105 can be a network-attached storage (NAS) or other device that uses an SMR-aware file system capable of using the SMR array subsystem 130 without an SMR translation layer 120.

Array zones 134 correspond to a set of disk zones 160 on the SMR drives, illustrated as Disk 1, Disk 2, and Disk 3, which comprise array 150. In some aspects, these disks are arranged in a redundant array of independent disks (RAID) configuration, such as RAID-1 or RAID-4. Compared to traditional magnetic drives, shingled drives use a write head with a stronger, but asymmetric, magnetic field to overlap the currently written track with the previous track, leaving only a relatively small strip of the previous write track untouched. Shingled drives store the bulk of their data in disk zones 160, which are collections of adjacent tracks in which data can only be appended. Disk zones 160 are each separated by gaps 165 large enough that a write to the last track in a disk zone 160 does not destroy the data in the first track of the subsequent disk zone 160. Without these gaps 165, any write to a shingled drive would require re-writing all data stored in later tracks. The large write heads and closely-packed tracks require a higher level of precision and leave less room for error while writing data, which makes shingled drives vulnerable to off-track wandering writes. However, the gaps 165 can limit any possible wandering write to a single disk zone 160. Provided that the SMR array subsystem 130 staggers data writes between disks and disk zones 160, data lost from wandering writes can be recovered using the data stored in corresponding disk zones 160 on the other disks of array 150.

In order to stagger data writes between disks and disk zones 160, write requests 122 specify an array zone 134 which the SMR array subsystem 130 can utilize when writing data 102. The SMR array subsystem 130 receives a write request 122 and caches each pair of data blocks 132 and array zones 134 in the non-volatile storage 140. In some aspects, the SMR array subsystem 130 writes to at most R drives at the same time (where R is the number of redundant disks in array 150), so that the data is in the non-volatile storage 140 or there are always at least (N–R) disks from which data on a disk zone 160 can be recovered in the case of a wandering write (where N is the total number of disks including the redundant disks).

In some examples, non-volatile storage 140 can be organized into M circular buffers 145, one for each open array zone 134, that contain data blocks 132 to be written and data blocks 132 that have been recently written. Due to cache limitations and internal firmware of SMR drives, only a finite number of disk zones 160 can be active, or "open," on each disk. If the maximum number of disk zones 160 is open and data 102 needs to be written to an unopened zone, the SMR array subsystem 130 can flush the buffer 145 for an idle array zone 134, close the array zone 134 and corresponding disk zones 160, and repurpose the buffer 145 for a new array zone 134.

In addition, memory (e.g., RAM) in host 105 can maintain information about which disk zones 160 and array zones 134 are open, how those zones correspond to one another, a drive index, and a write pointer for each drive. In one aspect, an array zone 134 corresponds to the same disk zone 160 on each of the disks in the array 150. For example, array zone x can correspond to Zone x on Disk 1, Disk 2, and Disk 3. In other aspects, an array zone 134 can correspond to different disk zones 160 on each disk or zones on a subset of the disks in the array 150.

In one example, the non-volatile storage 140 is located on a disk shelf or otherwise external to the host 105. In other examples, non-volatile storage 140 can be internal to host 105. In configurations with three or more disks in array 150, non-volatile storage 140 can consist of at least two mirrored devices for redundancy. Otherwise, a failure in the non-volatile storage 140 could result in losing data from the most recent writes. Non-volatile storage 140 acts as a persistent cache and can be a flash drive, NVRAM, a conventional hard disk drive, etc.

The minimum data capacity for non-volatile storage 140 is therefore the product of the size of a data block 132, the number of data blocks 132 in a data stripe 136 (which is N−R), the number of data stripes 136 retained in a buffer 145 at a time (which is 1+(N−R)/R rounded up), and the number of buffers 145 (which is the maximum number of open array zones 134). In addition, the minimum data capacity should include any metadata overhead.

Once a threshold number of data blocks 132 are placed into a buffer 145, the SMR array subsystem 130 retrieves them as data stripe 136. In some aspects, the number of data blocks 132 in a data stripe 136 is the total number of disks minus the number of redundant disks (N−R). For example, if array 150 were configured in RAID-4, one of the three disks would be redundant and used for parity information, meaning that a data stripe 136 would consist of two data blocks 132. In some aspects, the SMR array subsystem 130 waits until a full data stripe 136 of data blocks 132 is present in a buffer 145 before writing it to array zone 134. The term 'block' is used herein for simplicity and can refer to logical blocks on the disks, a partial logical block of data, or any other data subdivision.

When parity disks are present in the array 150, SMR array subsystem 130 creates parity information, which is written to the disks along with data stripe 136. In some aspects, the Boolean XOR function or a count of odd and even bits is performed on each block of data stripe 136 to create the parity information. The SMR array subsystem 130 can then write each of the data blocks 132 that comprise the data stripe 136 and its corresponding parity information to the disks using sequential write I/O streams 146.

In some aspects, the number of active write I/O streams 146 is at most the number of redundant disks in array 150. The data blocks 132 remain in the non-volatile storage 140 until the blocks are written to enough of the disks in array 150 so that data on a disk zone 160 can be recovered from the corresponding disk zones 160 on the other disks in the case of a wandering write. For example, assume that array 150 is configured in RAID-4, Disk 3 is a dedicated parity drive, and array zone 134 consists of Zone 1 on each of the three disks. One data block 132 in data stripe 136 is written to Zone 1 on Disk 1, and the other block of the stripe is written to Zone 1 on Disk 2 (or vice versa). Parity information is calculated for the stripe and written to Zone 1 on Disk 3. With data stripe 136 and its parity information written to array 150, the data can be recovered if a wandering write occurs, and therefore data stripe 136 can be safely discarded from buffer 145. Furthermore, since write I/O streams 146 only wrote to Zone 1 on each disk, gaps 165 should limit any wandering write to Zone 1.

Although data is described as being removed or discarded from buffers 145, an active removal operation is not necessary. In some examples, SMR array subsystem 130 maintains information about which data is no longer needed in each buffer 145. When new data blocks 132 arrive, they can replace the unneeded data in the buffer 145.

In further aspects, SMR array subsystem 130 can implement a variety of other functionality. For example, SMR array subsystem 130 can erase an array zone 134 by resetting the write pointer for the corresponding disk zone 160 on each disk to the start of the disk zone 160. The SMR array subsystem 130 can also garbage collect on array 150 by moving valid data to a new zone using a file system or object store policy. Furthermore, host 105 can recover missed writes in the event of an unclean shutdown. Host 105 queries write pointers of zones that were open before shutdown to determine whether any disk in array 150 has a different value of the write pointer than the other disks. If so, data in non-volatile storage 140 can be used to recover any missed writes.

Figure 2:
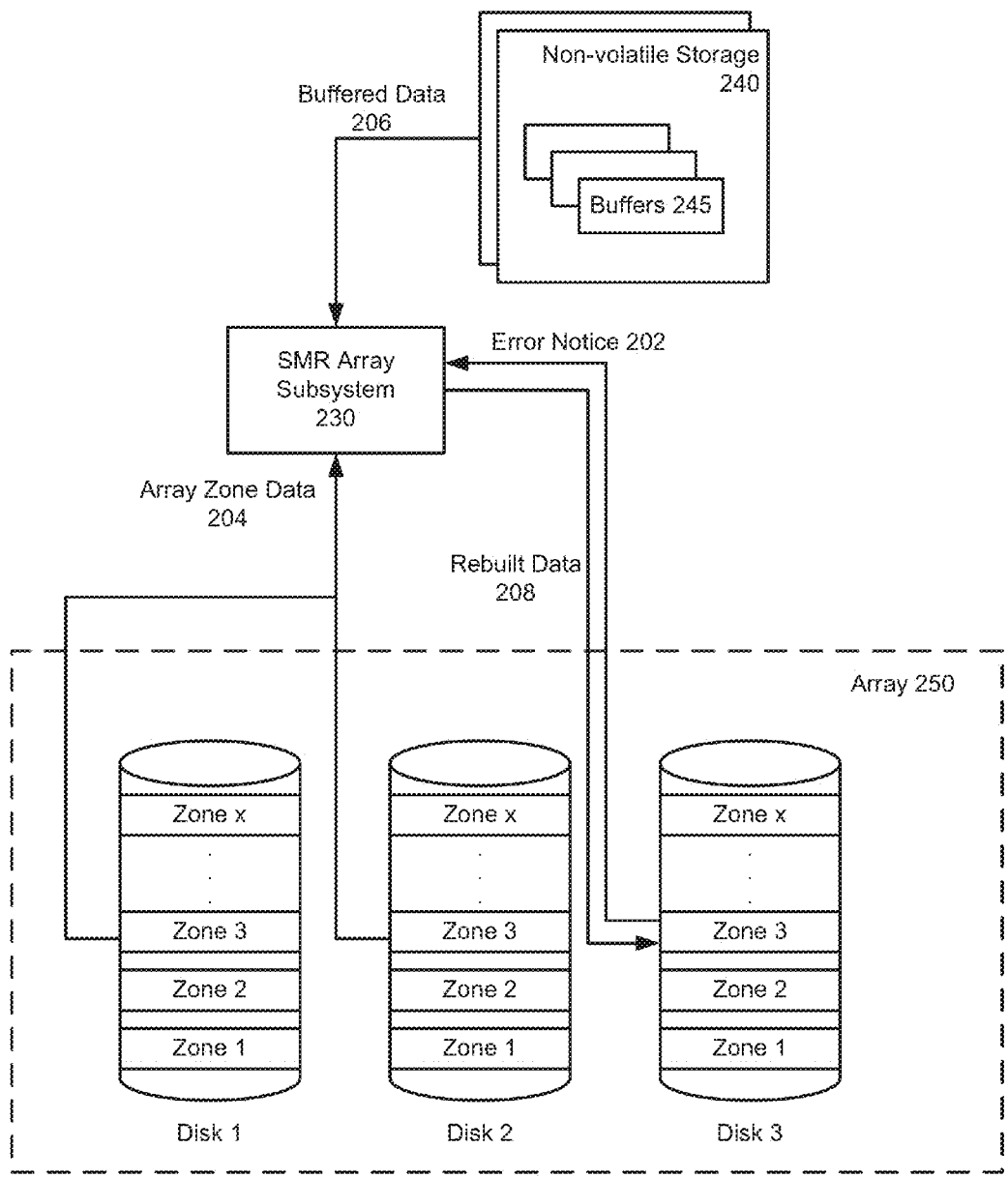
FIG. 2 illustrates sources of rebuilding overwritten data in a shingled magnetic drive array in an example system.

FIG. 2 illustrates sources of rebuilding overwritten data, for instance after a wandering write overwrote the data, in a shingled magnetic drive array in an example system. In an example shown, SMR array subsystem 230, non-volatile storage 240, buffers 245, and array 250 can correspond to their counterparts from FIG. 1. The remaining components of FIG. 1 can be present, but for simplicity are not illustrated in FIG. 2.

In some aspects, firmware executed on the disks in array 250 can be programmed to detect when normal writes wander off-track and overwrite previously written data. For example, relatively minor vibrations that would have no effect on a regular hard drive can move the write head or disk platter of a shingled drive out of alignment enough to accidentally obliterate data on adjacent tracks. These events are known as wandering writes and are a problem in the way of SMR adoption.

In the example shown, Disk 3 on array 250 detects that data has been overwritten by a wandering write in Zone 3 and issues an error notice 202 to the SMR array subsystem 230. The buffer 245 that caches data for Zone 3 on Disk 3 can be checked to determine whether the overwritten data is still available in non-volatile storage 240. If the data is still available, buffered data 206 including the data block or blocks containing the data can be retrieved from the buffer 245. In addition, since the SMR array subsystem 230 writes sequentially to the shingled disks, it also rewrites any data stored on disk tracks after the overwritten data. In some aspects, this further data is included in buffered data 206.

During the normal course of writing data to array 250, SMR array subsystem 230 maintains data in non-volatile storage 240 until it is possible to rebuild the data from the disks. As a result, if the overwritten data from Zone 3 on Disk 3 is no longer available in the non-volatile storage 240, it can be rebuilt using data from the corresponding zones on Disk 1 and Disk 2. For example, an array zone can comprise Zone 3 on each of the disks so when SMR array subsystem 230 receives error notice 202, it can retrieve array zone data 204 from Zone 3 on Disk 1 and Disk 2. Depending on the RAID configuration of array 250, array zone data 204 can consist of two separate blocks of data or one block of data paired with parity information for the data stripe.

In one example, the overwritten data in Zone 3 on Disk 3 could have contained parity information for the corresponding data stripe in Zone 3 on the other disks. Alternatively, the overwritten data could have been actual files or objects. In either case, the SMR array subsystem 230 can use buffered data 206 or array zone data 204 to rebuild the overwritten data and any further data on tracks in Zone 3 on Disk 3, which can be done with standard RAID rebuild techniques. SMR array subsystem 230 can then write rebuilt data 208 to Zone 3 on Disk 3, effectively recovering from the wandering write and preserving data integrity.

In some aspects, SMR array subsystem 230 can rebuild and rewrite the entirely of a disk zone in the event of a wandering write. The affected zones are erased and data is rebuilt into the zones. This method is fast, but risks losing data if one of the good disks fails during the rebuild process. In other aspects, SMR array subsystem 230 can write rebuilt data 208 into a different array zone and remap the zone identifiers as necessary. In further aspects, rebuilt data 208 can consist of only the corrupted data so that the entire zone is not rewritten.

Methodology

Figure 3:
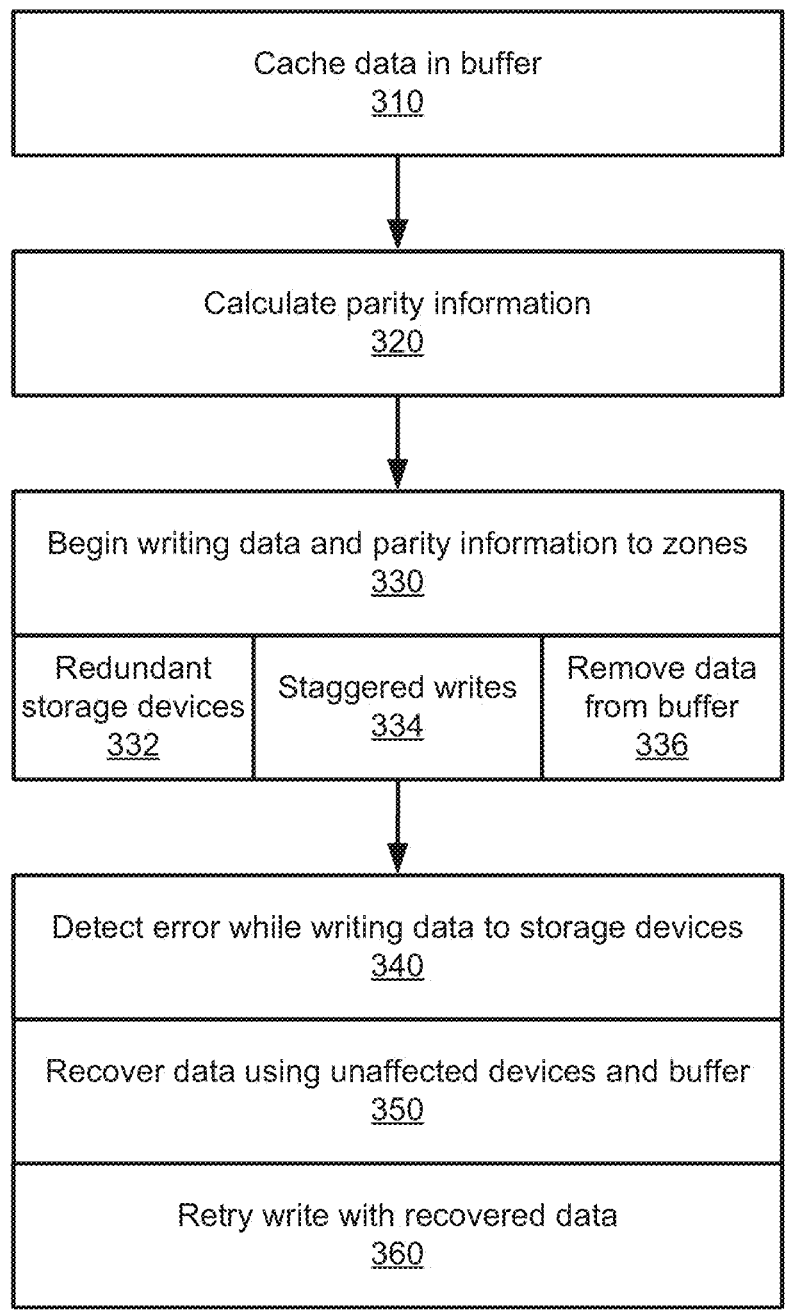
FIG. 3 illustrates an example method for writing data to an array of shingled magnetic recording drives while allowing for the recovery of data in the event of a wandering write.

FIG. 3 illustrates a method for writing data to an array of shingled magnetic recording drives while allowing for the recovery of data in the event of a wandering write, according to an aspect. While operations of the method 300 are described below as being performed by specific components, modules or systems of the storage system 100, it will be appreciated that these operations need not necessarily be performed by the specific components identified, and could be performed by a variety of components and modules, potentially distributed over a number of machines. Accordingly, references may be made to elements of storage system 100 for the purpose of illustrating suitable components or elements for performing a step or sub step being described. Alternatively, at least certain ones of the variety of components and modules described in storage system 100 can be arranged within a single hardware, software, or firmware component. It will also be appreciated that some of the steps of this method may be performed in parallel or in a different order than illustrated.

With reference to an example of FIG. 3, data 102 is received at a host 105 such as described with FIG. 1. The SMR array subsystem 130 can organize the data 102 into stripes and write the stripes to disk zones 160 on the array 150 of SMR disks in a manner that protects against the loss of data from wandering writes, which are normal writes that wander off-track and overwrite previously written data. In addition, the SMR array subsystem 130 can stripe and buffer the data 102 in a manner that minimizes the amount of non-volatile storage 140 required to ensure data integrity during the writing process (310).

When parity, mirroring, or erasure coding is being applied in the array 150, SMR array subsystem 130 creates redundant information, which is written to the disks along with data stripe 136 (320). In some aspects, the Boolean XOR function or a count of odd and even bits is performed on each block of data stripe 136 to create parity information. In other aspects, data stripe 136 is encoded along with the redundant information to create erasure codes that are written to the disks.

The SMR array subsystem 130 can then write each of the data blocks 132 that comprise the data stripe 136 and its corresponding redundant information to the corresponding disk zones on the array 150 (330).

In some aspects, the number of active write I/O streams 146 is at most the number of redundant disks in array 150 (332). In order to stagger data writes between disks and disk zones 160, write requests 122 specify an array zone 134 which the SMR array subsystem 130 can utilize when writing data 102. The SMR array subsystem 130 receives a write request 122 and caches each pair of data blocks 132 and array zones 134 in the non-volatile storage 140. In some aspects, the SMR array subsystem 130 writes to at most R drives at the same time (where R is the number of redundant disks in array 150), and data blocks 132 remain in the non-volatile storage 140 until the blocks are written to enough of the disks in array 150 so that data on a disk zone 160 can be recovered from the corresponding disk zones 160 on the other disks in the case of a wandering write (334).

In another aspect, two-dimensional RAID striping is used to stagger writes between disks. In two-dimensional RAID striping, data and redundant information are striped across the total number of disks (N) and N divided by the number of redundant disks (N/R) zones within each disk. This allows SMR array subsystem 130 to simultaneously write portions of data 102 to different disk zones 160 on each of the disks in array 150. This results in all disks being busy writing while still preserving the recoverability of each array zone 134 in the event of a wandering write. However, two-dimensional RAID striping also fragments data 102 across zones, which negatively impacts read performance. Nonetheless, it is suited for archival workloads with high data ingest rates and lowered requirements for reading speed. In some aspects, client applications can divide data 102 into several parallel write requests to reduce fragmentation of the original undivided data 102. SMR array subsystem 130 distributes these multiple incoming write requests between different array zones in such a manner that consecutive data 102 is written together.

If R disks have failed, zones are marked read-only until at least one drive is reconstructed in order to prevent data loss in the case of a wandering write. However, in some aspects, two-dimensional erasure coding can be employed so that zones can be written and a lost zone can be recovered even if all R disks have failed. For example, instead of striping the data across N/R zones, the data is striped into (N/R−Q) stripes with the last Q stripes used for the erasure code. In some examples, Q is either 1 or 2.

Once data stripe 136 and its redundant information are written to array 150, the data can be recovered if a wandering write occurs, and therefore data stripe 136 can be safely discarded from buffer 145 (336).

In some aspects, an error that occurred when writing data to one of the zones in array 150 is detected (340). For example, relatively minor vibrations that would have no effect on a regular hard drive can move the write head or disk platter of a shingled drive out of alignment enough to accidentally obliterate data on adjacent tracks. These events are known as wandering writes and are a problem in the way of SMR adoption.

The buffer 145 that caches data for the affected zone can be checked to determine whether the overwritten data is still available in non-volatile storage 140. If the data is still available, the data block or blocks containing the data can be retrieved from buffer 145. During the normal course of writing data to array 150, SMR array subsystem 130 maintains data in non-volatile storage 140 until it is possible to rebuild the data from the disks. As a result, if the overwritten data is no longer available in the non-volatile storage 140, it can be rebuilt using data from the corresponding zones on the other disks of array 150 (350). In either case, the SMR array subsystem 130 can use data from buffer 145 or the array zone to rebuild the overwritten data using RAID rebuild techniques. Once the data is rebuilt, the write can be retried using the rebuilt data (360).

EXAMPLES

FIG. 4 illustrates a set of example operations for storing data and writing the data to a shingled magnetic drive array in a RAID-1 type configuration, in accordance with some aspects. In RAID-1, data blocks are written to Disk 1 and mirrored on the corresponding zone on Disk 2 for use as a redundant backup copy. Since the number of data blocks in a stripe is the number of disks minus the redundant disks (N−R; N=2, R=1), a stripe of data is therefore a single block for RAID-1. In addition, since the same data is written to both drives, parity information is unnecessary. The term 'block' is used herein for simplicity and can refer to logical blocks on the disks or a partial block in some aspects.

In this example, the row labeled 'Flash' represents a non-volatile storage device (e.g., flash memory), and each column represents the state of an array zone with its corresponding buffer in the flash memory, disk zone on Disk 1, and disk zone on Disk 2.

According to some aspects, a first stripe of data containing block [0] is appended to an array zone buffer in the flash. After checking that both drives are functioning to ensure data integrity, block [0] is copied from the flash and written to Disk 1. Since block [0] has only been written to one disk, it cannot yet be recovered if it were overwritten on Disk 1. As a result, block [0] is retained in the flash.

Next, a second stripe of data containing block [1] is appended to the array zone buffer in the flash. Both blocks [0] and [1] in the flash can be written serially to Disk 2. Since block [0] has now been written to both disks, it is safe to remove it from the flash. In the event that block [0] is overwritten on either disk, it can be recovered from the other. However, block [1] is only present on Disk 2 so it is retained in the flash.

A third stripe of data containing block [2] is then appended to the array zone. Similar to writing blocks [0] and [1] to Disk 2, blocks [1] and [2] can be written to Disk 1 in serial fashion, block [1] removed from the flash, and block [2] retained until it is written to Disk 2. In one implementation, block [2] is written to Disk 2 and removed from the flash if no more stripes for this array zone are forthcoming; alternatively, block [2] can remain in the flash and only be written to Disk 2 when the next stripe is received or the array zone is closed.

FIG. 5A illustrates a set of example operations for storing data and writing the data to a shingled magnetic drive array in a RAID-4 type configuration, in accordance with some aspects. In RAID-4, one block of data is written to Disk 1, and the next block is written to the corresponding zone on Disk 2 (or vice versa). Parity information is calculated for the pair of blocks and written to the corresponding zone on Disk 3. Since the number of data blocks in a stripe is the number of disks minus the redundant disks (N−R; N=3, R=1), a stripe of data is therefore two blocks for this example of RAID-4. Although RAID-4 is used for this example, the same procedure can be trivially adapted for RAID-5 by distributing the parity blocks between Disks 1, 2, and 3.

According to some aspects, a first stripe of data containing a pair of blocks [0] is appended to an array zone buffer in the flash. After checking that all drives are functioning to ensure data integrity, the first block of stripe [0] is copied from the flash and written to Disk 1. A second stripe of data containing a pair of blocks [1] is appended to the array zone, and the remaining block [0] from the first stripe and one of the blocks [1] from the second stripe are written to Disk 2. In one implementation, the second block [1] from the stripe is chosen to be written to Disk 2 for consistency, although the alternative may be chosen instead. Both blocks of stripe [0] are written to disks, but they cannot yet be recovered if overwritten on either disk without corresponding parity information. As a result, stripe [0] is retained in the flash.

Next, a third stripe of data containing blocks [2] is appended to the array zone buffer in the flash. Parity information is calculated for stripes [0], [1], and [2] and written to the corresponding disk zones on Disk 3, which is a dedicated parity disk in RAID-4. If a disk in the array overwrites data in any of the blocks, the corresponding block on the other disk can be combined with the stripe's parity data (e.g., by using the Boolean XOR function) to reconstruct the overwritten data. Since all of stripe [0] and its parity information is written to the disks, it is safe to remove it from the flash. Similar steps can then be performed to append stripe [3] and write its blocks and parity information to the array.

FIG. 5B illustrates a set of example operations for storing data and writing the data to a shingled magnetic drive array in a RAID-6 (double parity) type configuration, in accordance with some aspects. In RAID-6, one block of data is written to Disk 1, and the next block is written to the corresponding zone on Disk 2 (or vice versa). Parity information is calculated for the pair of blocks and written to the corresponding zone on Disk 3, and further parity information, using various techniques, is written to Disk 4. Since the number of data blocks in a stripe is the number of disks minus the redundant disks (N−R; N=4, R=2), a stripe of data is therefore two blocks for this example of RAID-6. Although two dedicated parity disks are used for this example for simplicity, the same procedure can be adapted for implementations that distribute the parity blocks between Disks 1-4.

According to some aspects, a first stripe of data containing a pair of blocks [0] is appended to an array zone buffer in the flash. After checking that at least 3 of the 4 drives are functioning to ensure data integrity, both blocks of stripe [0] are copied from the flash and written to Disks 1 and 2 roughly simultaneously. Unlike previous examples, RAID-6 has two parity drives and can therefore maintain data integrity when writing to two disks at once, provided that all 4 disks are functional. If one disk is offline, the array can function similarly to RAID-4 or RAID-5.

A second stripe of data containing a pair of blocks [1] is appended to the array zone, and parity information is calculated for both stripes and written to Disks 3 and 4 simultaneously. Next, a third stripe of data containing blocks [2] is appended to the array zone buffer in the flash then written to Disks 1 and 2. Similar steps can then be performed to append stripe [3] and write its blocks and parity information to the array.

Figure 6:
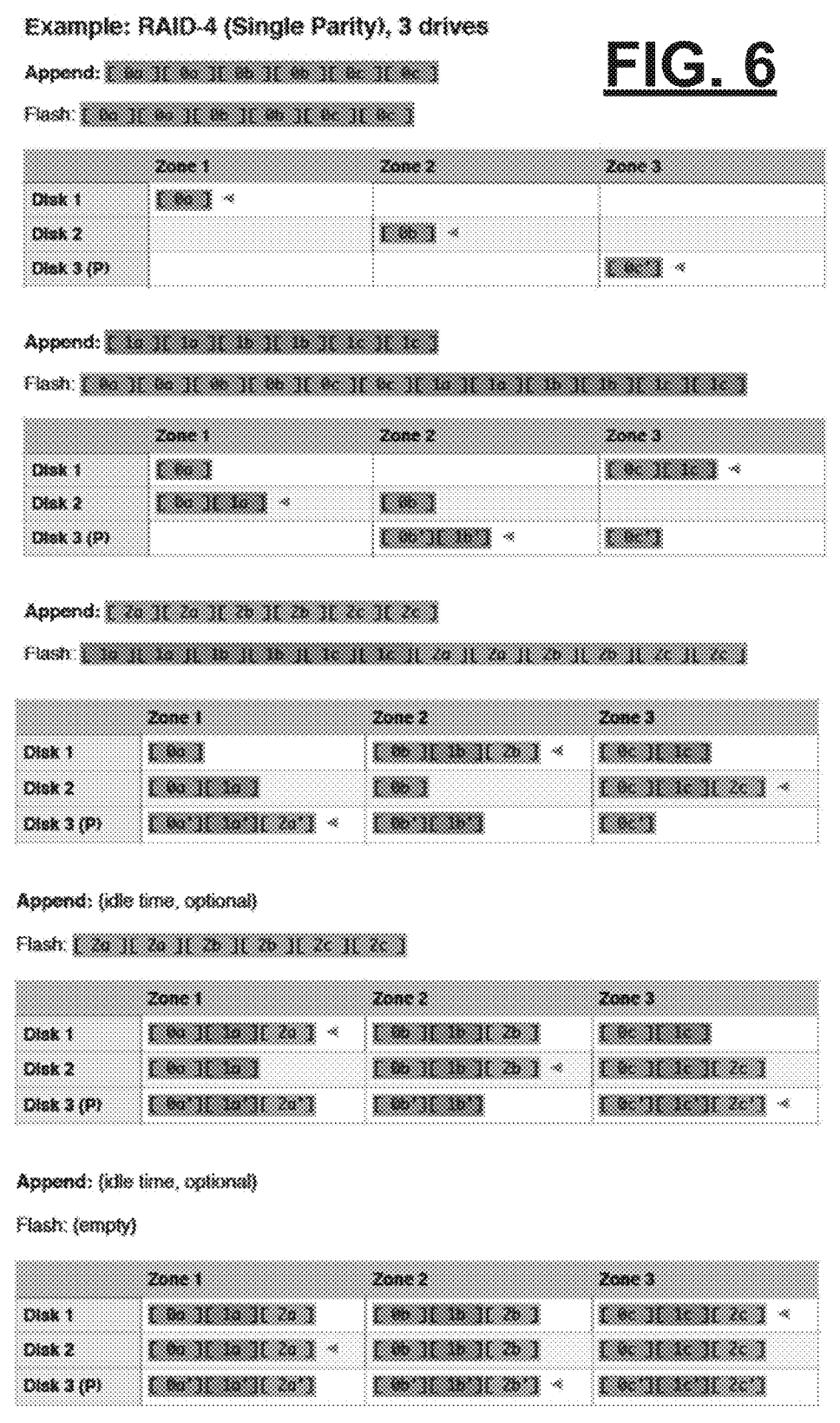

FIG. 6 illustrates a set of example operations for storing data and writing the data using two-dimensional RAID striping to a shingled magnetic drive array in a RAID-4 type configuration, in accordance with some aspects. Unlike previous examples, FIG. 6 illustrates an implementation of two-dimensional RAID striping, which allows the system to maintain data integrity while writing to all disks in the array simultaneously. Data and parity information are striped across the total number of disks (N) and N divided by the number of redundant disks (N/R) zones within each disk. In this example of 3 total disks with 1 redundant, data is striped across 3 disks and 3 zones within each disk.

In this example, incoming data is separated across 3 array zones a, b, and c and, the same as previous examples, each array zone keeps its own corresponding buffer. Since the number of data blocks in a stripe is the number of disks minus the redundant disks (N−R; N=3, R=1), a stripe of data is therefore two blocks for this example of RAID-4. However, in another aspect, one array zone and its buffer can hold data for all 3 disk zones on all 3 disks, putting six blocks of data in one stripe. Although RAID-4 is used for this example, the same procedure can be trivially adapted for RAID-5 by distributing the parity blocks between Disks 1, 2, and 3.

According to some aspects, incoming data labeled [0a-c] is divided into three stripes between array zones a, b, and c and appended to each array zone buffer in the flash. After checking that all drives are functioning to ensure data integrity, the first block of stripe [0a] is copied from the flash buffer for array zone a and written to Zone 1 on Disk 1. At the same time, the first (or second) block of stripe [0b] is copied from the flash buffer for array zone b and written to Zone 2 on Disk 2, and parity information for stripe [0c] is calculated and written to Zone 3 on Disk 3.

Further data labeled [1a-c] is divided into three stripes between array zones a, b, and c and appended to each array zone buffer in the flash. The system can then simultaneously write [0a] and [1a] to Zone 1 on Disk 2, parity information for stripes [0b] and [1b] to Zone 2 on Disk 3 and [0c] and [1c] to Zone 3 on Disk 1. This simultaneous staggered writing pattern can continue for a third set of data, at which point [0a-c] and its parity information are stored on the array and can be removed from the flash buffers. Using this method, even a wandering write event (e.g., a vibration) that affects all three disks at the same time does not compromise data integrity because each disk simultaneously writes to a different disk zone. This allows writes to the array to be performed with similar performance to traditional RAID.

Figure 7:
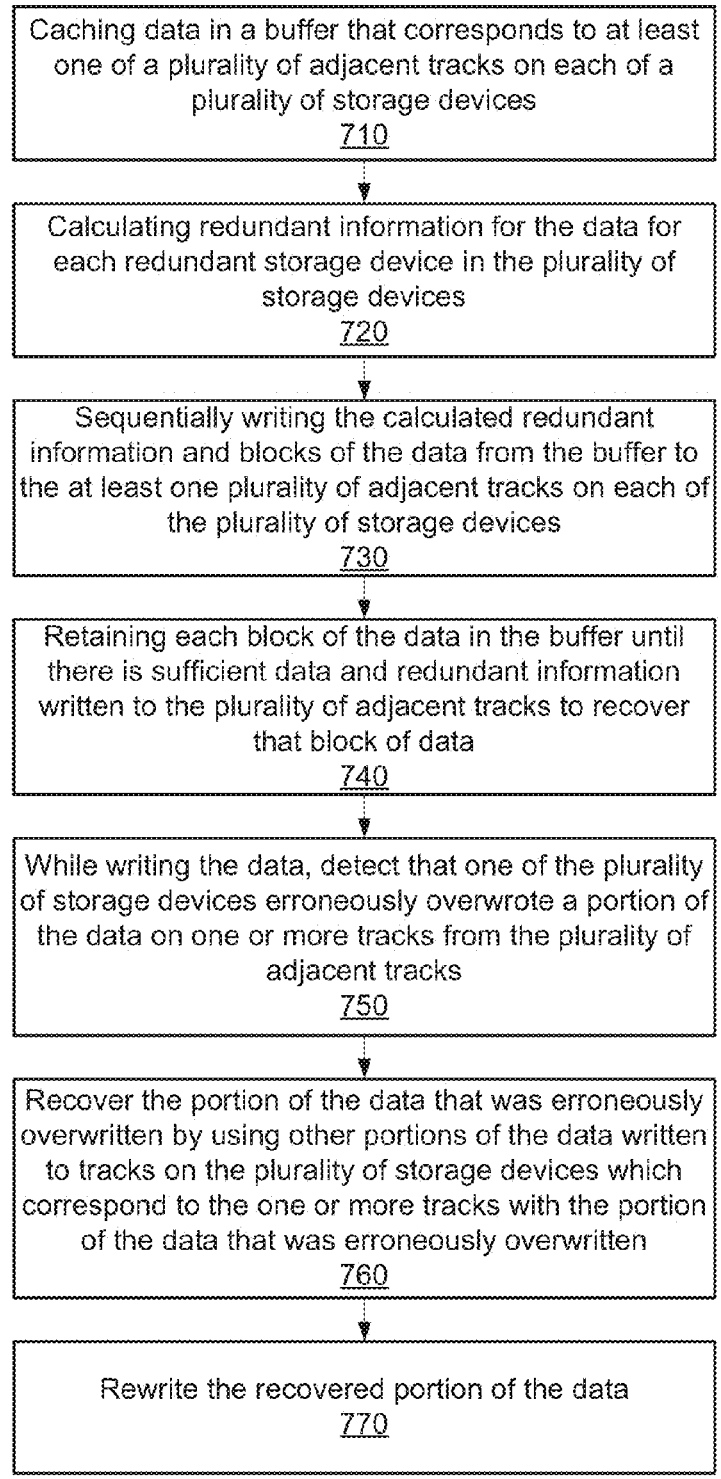
FIG. 7 illustrates an example method for raid configurations for shingled magnetic recording drives with wandering write protection, in accordance with some aspects.

FIG. 7 illustrates an example method for raid configurations for shingled magnetic recording drives with wandering write protection. In some aspects, data is cached in a buffer that corresponds to one of the plurality of adjacent tracks on each of the plurality of storage devices (710). Parity information for the data for each parity storage device in the plurality of storage devices is also calculated (720). The calculated parity information and blocks of the data from the buffer are sequentially written to the corresponding one of the plurality of adjacent tracks on each of the plurality of storage devices (730), and each block of the data is retained in the buffer until there is sufficient data and parity information written to the plurality of adjacent tracks to recover that block of data (740).

While writing the data, storage system 100 can detect that one of the plurality of storage devices erroneously overwrote a portion of the data on one or more tracks from the plurality of adjacent tracks (750). The portion of the data that was erroneously overwritten can be recovered using other portions of the data written to tracks on the plurality of storage devices which correspond to the one or more tracks with the portion of the data that was erroneously overwritten (760). The storage system 100 can then rewrite the recovered portion of the data (770).

Computer System

Figure 8:
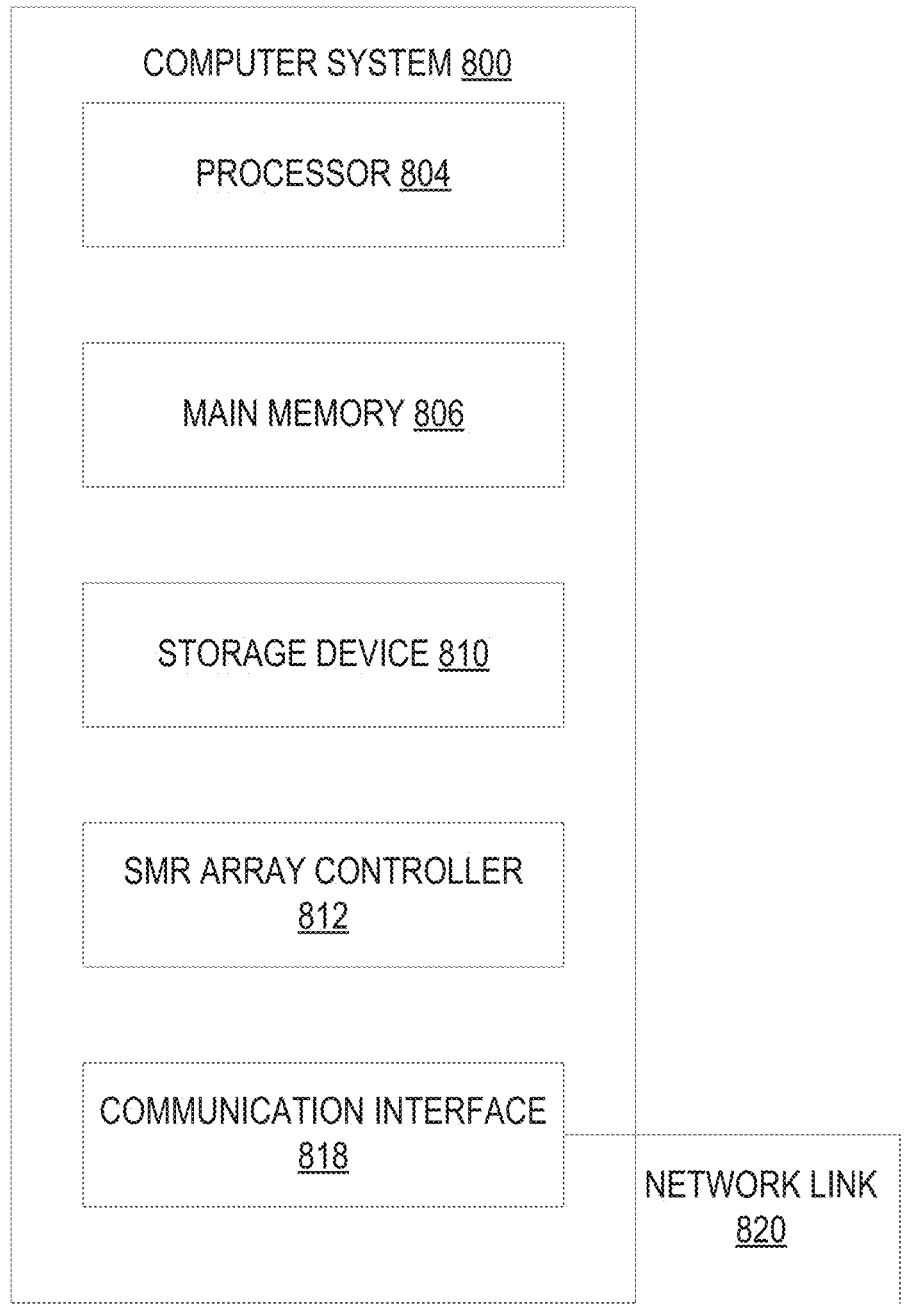
FIG. 8 is a block diagram that illustrates a computer system upon which aspects described herein may be implemented.

FIG. 8 is a block diagram that illustrates a computer system upon which aspects described herein may be implemented. For example, in the context of FIG. 1, host 105 may be implemented using one or more servers such as described by FIG. 8.

In an aspect, computer system 800 includes processor 804, memory 806 (including non-transitory memory), storage device 810, and communication interface 818. Computer system 800 includes at least one processor 804 for processing information. Computer system 800 also includes the main memory 806, such as a random access memory (RAM) or other dynamic storage device, for storing information and instructions to be executed by processor 804. Main memory 806 also may be used for storing temporary variables or other intermediate information during execution of instructions to be executed by processor 804. Computer system 800 may also include a read only memory (ROM) or other static storage device for storing static information and instructions for processor 804. The storage device 810, such as a magnetic disk or optical disk, is provided for storing information and instructions. The communication interface 818 may enable the computer system 800 to communicate with one or more networks through use of the network link 820 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 800 for implementing the techniques described herein. According to one aspect, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A storage system comprising:
 a memory;
 a processor; and
 a machine-readable medium comprising instructions executable by the processor to cause the storage system to:
 create in the memory a plurality of buffers for a plurality of zones on a plurality of storage devices;
 based on detection of a threshold number of data blocks in the plurality of buffers, stagger writing of a set of the data blocks that form a data stripe across a first array zone on the plurality of storage devices based, at least in part, on limiting writes to the plurality of storage devices to no more than R storage devices, wherein R is a number of the plurality of storage devices used for protection;
 based on detection of a wandering write into a first zone on a first storage device of the plurality of storage devices while writing the data stripe to the first array zone, recover the one or more data blocks that were erroneously overwritten by the wandering write into the first zone with one or more data blocks from a first buffer of the plurality of buffers that corresponds to the first zone on the first storage device, with one or more data blocks from one or more other storage devices of the plurality of storage devices, or with data blocks from the first buffer and from one or more other storage devices of the plurality of storage devices; and rewrite the recovered one or more data blocks.

2. The system of claim 1, wherein the machine-readable medium further comprises instructions executable by the processor to cause the storage system to:

retain data blocks of the data stripe in the plurality of buffers until data blocks of the data stripe have at least been written to R of the plurality of storage devices.

3. The system of claim 1, wherein each of the plurality of buffers corresponds to a different one of the plurality of zones on the plurality of storage devices.

4. The system of claim 1, wherein the plurality of storage devices are shingled magnetic recording drives.

5. The storage system of claim 1, wherein the plurality of buffers is M buffers, wherein M is a number of the plurality of zones that can be open concurrently in the plurality of storage devices.

6. The storage system of claim 1, wherein a capacity of the plurality of buffers is sufficient for (1+(rounded up ((N−R)/R))) data stripes, wherein N is a number of the plurality of storage devices.

7. The storage system of claim 1, wherein the first array zone comprises zones across the plurality of storage devices having a same zone identifier.

8. The storage system of claim 1, wherein the first array zone comprises zones across the plurality of storage devices having heterogeneous zone identifiers.

9. A non-transitory computer-readable medium that stores instructions, executable by one or more processors, the instructions executable to:

create a plurality of buffers for a plurality of zones on a plurality of storage devices;

based on detection of a threshold number of data blocks in the plurality of buffers, stagger writing of a set of the data blocks that form a data stripe across a first array zone on plurality of storage devices based, at least in part, on limiting writes to the plurality of storage devices to no more than R storage devices, wherein R is a number of the plurality of storage devices used for protection;

based on detection of a wandering write into a first zone of a second array zone on a first storage device of the plurality of storage devices while writing the data stripe to the first array zone, recover the one or more data blocks that were erroneously overwritten by the wandering write into the first zone with one or more data blocks from a first buffer of the plurality of buffers that corresponds to the first zone on the first storage device, with one or more data blocks of a second array zone on one or more other storage devices of the plurality of storage devices, or with data blocks from the first buffer and from the second array zone across one or more other storage devices of the plurality of storage devices; and rewriting the recovered one or more data blocks.

10. The non-transitory computer-readable medium of claim 9 further comprising instructions to:

retaining data blocks of the data stripe in the plurality of buffers until data blocks of the data stripe have at least been written to R of the plurality of storage devices.

11. The non-transitory computer-readable medium of claim 9, wherein each of the plurality of buffers corresponds to a different one of the plurality of zones on the plurality of storage devices.

12. The non-transitory computer-readable medium of claim 9, wherein the plurality of storage devices are shingled magnetic recording drives.

13. The non-transitory computer-readable medium of claim 9, wherein the instructions to stagger writing of the set of data blocks that form the data stripe comprise instructions executable to write parity data to a parity storage device of the plurality of storage devices in at least one of the staggered writes.

14. The non-transitory computer-readable medium of claim 9, wherein the plurality of buffers is M buffers, wherein M is a number of the plurality of zones that can be open concurrently in the plurality of storage devices.

15. The non-transitory computer-readable medium of claim 9, wherein a capacity of the plurality of buffers is sufficient for (1+(rounded up ((N−R)/R))) data stripes, wherein N is a number of the plurality of storage devices.

16. A method of recovering from errors detected during writing data to storage devices, the method comprising:

based on detection of a threshold number of data blocks in a plurality of buffers, stagger writing of a set of the data blocks that form a data stripe across a first array zone on a plurality of storage devices based, at least in part, on limiting writes to the plurality of storage devices to no more than R storage devices, wherein R is a number of the plurality of storage devices used for protection;

based on detection of a wandering write into a first zone on a first storage device of the plurality of storage devices while writing the data stripe to the first array zone, recovering the one or more data blocks that were erroneously overwritten by the wandering write into the first zone with one or more data blocks from a first buffer of the plurality of buffers that corresponds to the first zone on the first storage device, with one or more data blocks from one or more other storage devices of the plurality of storage devices, or with data blocks from the first buffer and from one or more other storage devices of the plurality of storage devices; and rewriting the recovered one or more data blocks.

17. The method of claim 16, further comprising:

retaining data blocks of the data stripe in the plurality of buffers until data blocks of the data stripe have at least been written to R of the plurality of storage devices.

18. The method of claim 16, wherein the plurality of buffers each corresponds to a different zone of the plurality of zones on the plurality of storage devices.

19. The method of claim 16, wherein the plurality of storage devices are shingled magnetic recording drives.

20. The method of claim 16, wherein staggering writing of the set of data blocks that form the data stripe comprises writing parity data to a parity storage device of the plurality of storage devices in at least one of the staggered writes.

21. The method of claim 16, wherein the plurality of buffers is M buffers, wherein M is a number of the plurality of zones that can be open concurrently in the plurality of storage devices.

22. The method of claim 16, wherein a capacity of the plurality of buffers is sufficient for (1+(rounded up ((N−R)/R))) data stripes, wherein N is a number of the plurality of storage devices.

* * * * *